United States Patent [19]
Lianza et al.

[11] Patent Number: 5,218,463
[45] Date of Patent: Jun. 8, 1993

[54] STRAIGHT-LINE OPTICAL PATH X-RAY SCANNER WHICH AUTOMATICALLY ADJUSTS SCANNING APERTURE SIZE

[75] Inventors: Thomas A. Lianza, Bedford, N.H.; Arthur W. Kliman, Boxford, Mass.; Carl D. Lutz, Derry, N.H.

[73] Assignee: Sequel Imaging, Londonderry, N.H.

[21] Appl. No.: 617,986

[22] Filed: Nov. 26, 1990

[51] Int. Cl.⁵ .............................. H04N 1/04
[52] U.S. Cl. ....................... 358/487; 378/161; 378/187; 378/171
[58] Field of Search ............. 358/487, 76; 354/185, 354/159, 21; 353/88, 90; 378/171, 172, 173, 174, 100, 160, 161, 171, 181, 185–188; 355/71; 356/443, 444

[56] References Cited

U.S. PATENT DOCUMENTS

| | | | |
|---|---|---|---|
| 3,716,660 | 2/1973 | Friedman | 358/487 |
| 3,764,808 | 10/1973 | Lackey et al. | 378/181 |
| 3,936,642 | 2/1976 | Lajus et al. | 378/171 |
| 4,143,273 | 3/1979 | Richey et al. | 378/160 |
| 4,176,964 | 12/1979 | Knör et al. | 356/444 |
| 4,432,095 | 2/1984 | Adelmeyer et al. | 378/176 |
| 4,597,654 | 7/1986 | Harvey et al. | 354/159 |
| 4,760,589 | 7/1988 | Siczek | 378/181 |
| 4,818,861 | 4/1989 | Horiuchi et al. | 356/444 |
| 5,036,402 | 7/1991 | Shiota | 358/76 |
| 5,072,311 | 12/1991 | Hiramatsu et al. | 358/487 |

Primary Examiner—Edward L. Coles, Sr.
Assistant Examiner—Jill Jackson
Attorney, Agent, or Firm—Cesari and McKenna

[57] ABSTRACT

A simple, low cost x-ray scanner providing enhanced resolution is formed by providing a straight-line optical path from an illuminating source, through the x-ray image to be scanned and thence to an imaging lens which forms an image on a CCD array. The x-ray film is fed by means of gravity to a pair of rollers, immediately above which are formed first and second apertures on either side of the roller. The film is eliminated through the apertures which provide a field stop for the optical system. A shutter immediately adjacent one of the apertures is coupled to a width-adjustment mechanism actuated by a feed guide for the film to thereby adjust the width of the aperture to the width of the film. The output of the CCD is modified to expand the output at low levels and compress it at high levels via a logarithmic mapping to adapt the high resolution CCD output to a lower resolution video display processor.

8 Claims, 3 Drawing Sheets $$N_{VIDEO} = N_{VIDEO:MAX} * \left( \frac{N_{SCANNER}}{N_{SCANNER:MAX}} \right)^{\Gamma}$$

STRAIGHT-LINE OPTICAL PATH X-RAY SCANNER WHICH AUTOMATICALLY ADJUSTS SCANNING APERTURE SIZE

BACKGROUND OF THE INVENTION

A. Field of the Invention

The invention relates to X-ray imaging systems, and comprises a compact system that scans an X-ray film line by line and converts the resultant data into a form suitable for display on a video monitor under control of a standard personal computer.

B. Prior Art

X-ray images provide significant diagnostic information in the medical field. Typically such images have been viewed directly from the film with little additional change other than, perhaps, magnification. With the increasing availability of computational capabilities, such images are now more frequently being converted to digital images for subsequent display on a video monitor. This allows the application of image enhancement techniques to the original image, and can greatly improve the readability and usefulness of the image.

Typically, the digitized image is obtained by optically scanning the X-ray film by means of an imaging system comprising one or more lenses which project the image element-by-element onto a converter; the latter converts the light received from each element into an electrical signal that is stored for subsequent processing and display. Many such systems use scanning mirrors, multiply-folded optical paths, and the like to accomplish this. This increases the cost of such systems and, by increasing their complexity, also makes maintenance more difficult and more frequently needed.

DESCRIPTION OF THE INVENTION

Objects of the Invention

Accordingly, it is an object of the present invention to provide an improved X-ray scanner.

It is a further object of the invention to provide a simplified, low cost X-ray scanner.

It is yet another object of the invention to provide an improved X-ray scanner that is adapted for mounting in standard electronic cabinetry.

Still a further object of the invention is to provide an improved X-ray scanner that has enhanced detail resolution at low intensity levels.

Brief Summary of the Invention

In accordance with the present invention, an improved X-ray scanner has a straight-line optical path between an illuminating source and an imaging lens which forms a line image of an X-ray film on an imaging array, e.g., a charge-coupled device. An entrance chute inclined at a slight angle to the vertical (e.g., 15 degrees) receives the film and feeds it downwardly by gravity to the nip of a pair of feed rollers. The chute terminates just above the rollers, and is curved at the bottom end thereof to align with the vertical so that the film proceeds through the rollers in a generally vertical direction.

A pair of line apertures are formed near the bottom of the chute on opposite sides thereof and at a position immediately above the rollers. The apertures are aligned with a light source which illuminates the film through a first of these apertures; a second of these apertures forms a field stop for light transmitted through the film. In accordance with the present invention, a shutter immediately adjacent the field stop aperture is coupled to a width adjuster on the entrance chute. Setting the width adjuster to receive film of a particular width thereby also sets the shutter to the appropriate scanning line width.

The film is advanced a line at a time by the rollers, one of which is driven by a stepping motor and the other of which is an idler roller. A plurality of baffles positioned intermediate the field stop aperture and the imaging lens reduces the amount of light normally outside the optical path of the lens that is reflected into the lens from the walls of the scanner enclosure.

The image formed by the lens is projected onto a charge coupled device whose output is in the form of electrical signals indicative of the intensity of the received light across the scan line. These signals are digitized and then fed to a computer for processing in a known manner; the resultant signal is applied to a video monitor for viewing by the user. Charge coupled devices currently available are capable of providing up to sixteen bits of resolution, that is, 65,535 levels of resolution. However, the video monitors and associated digital display hardware commonly available in general purpose personal computer systems have resolutions commonly on the order of no more than approximately eight bits, that is, 256 levels. Heretofore, in at least one prior scanner, the display resolution has been accomodated to the converter output by truncating the extra lower-order bits of the converter output. This results in "step" changes in the resolution of the image at lower intensity levels, and thus degradation of the image quality at those levels. In contrast, in the present invention, the converter output is accomodated to the video display input by mapping the former to the latter in such a manner as to expand the contrast at low intensity levels where it is most critical and compress it at higher levels where it is less critical. This significantly improves the image quuality without adding significant cost to the system.

DETAILED DESCRIPTION OF THE INVENTION

The above and other and further objects and features of the invention will be more readily understood on reference to the following detailed description of the invention when taken in conjunction with the accompanying drawings, in which.

Figure 1:
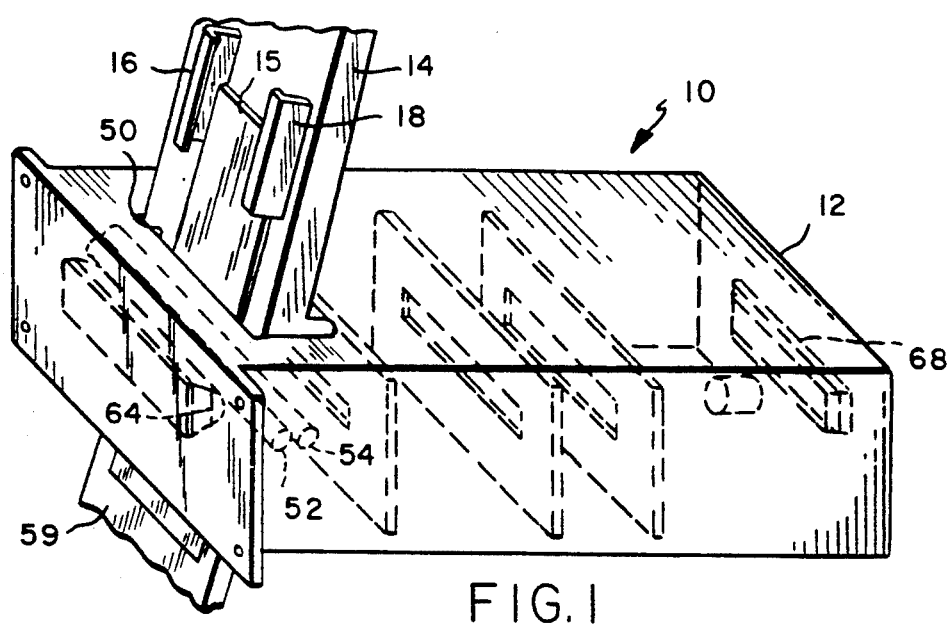
FIG. 1 is a view in perspective of an improved X-ray scanner in accordance with the present invention.
Figure 2:
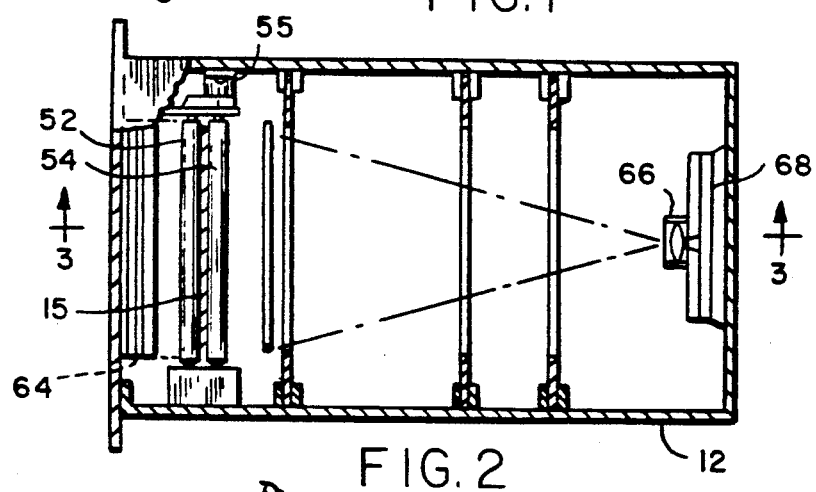
FIG. 2 is a top plan view of the scanner of FIG. 1, with portions broken away to show detail.
Figure 3:
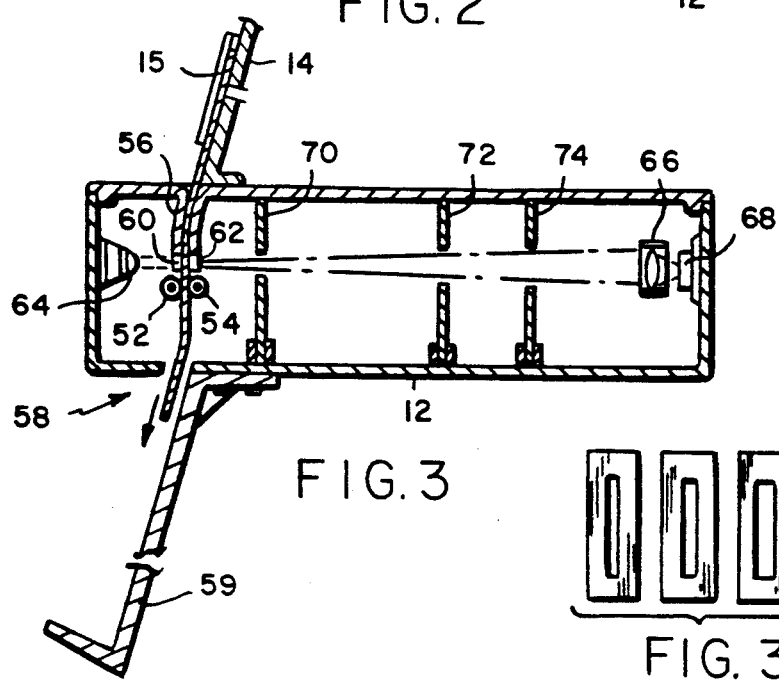
FIG. 3 is a side elevation view, in section, of the scanner of FIG. 1.
Figure 3A:
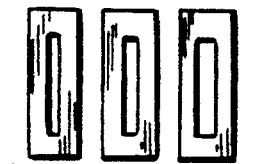
FIG. 3A shows the respective baffles in plan view.
Figure 4:
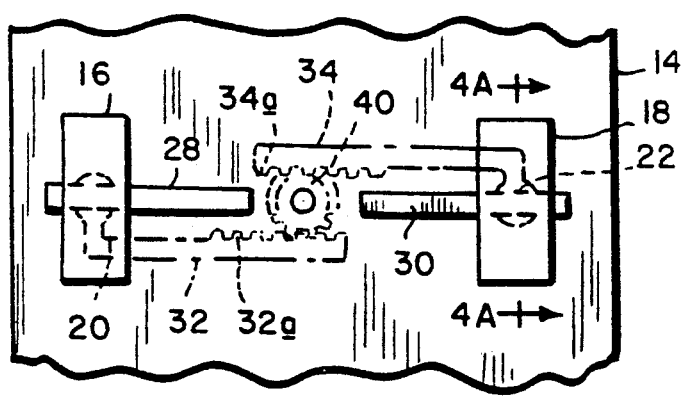
FIG. 4 is a vertical front view of a protion of the scanner of FIG. 1 showing the size adjustment guides in more detail.
Figure 4A:
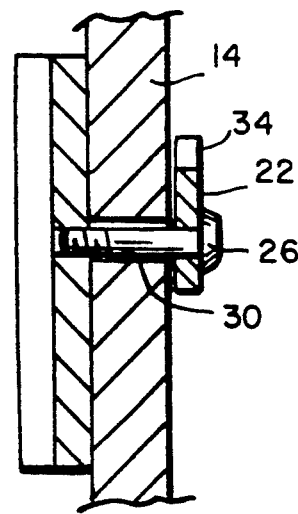
FIG. 4A is a vertical sectional view along the lines 4A—4A of FIG. 4.
Figure 5:
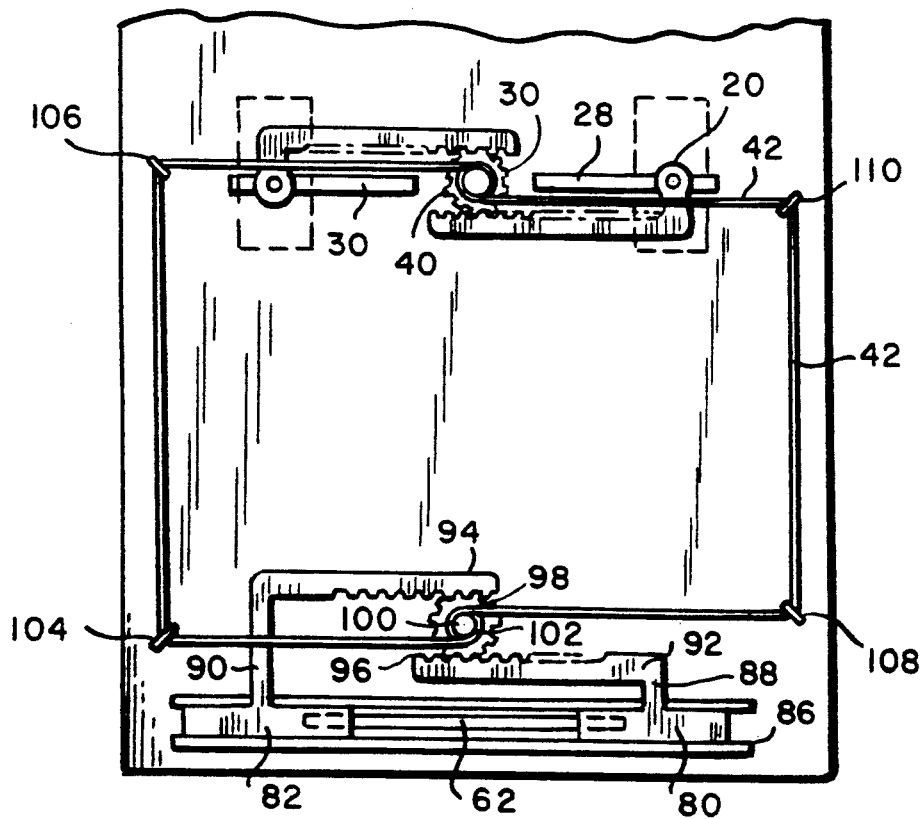
FIG. 5 is rear view of a portion of the film feed chute of FIG. 1 showing the aperture coupling in detail.

In the drawings, an X-ray scanner 10 in accordance with the invention comprises a housing 12 having a film feed chute 14 inclined to the vertical at a slight angle (e.g., 15 degrees). Edge guides 16, 18 are slidably mounted on the chute by means of feet 20, 22 located on the rear face of the chute and connected to the guides by means of fasteners such as fastener 26 extending through slot 30, as shown in detail in FIG. 4A. The feet 20, 22 have arms 32, 34, respectively, extending therefrom. These arms have toothed faces 32A, 34A for engaging a correspondingly toothed wheel 36 mounted centrally between the arms. A pulley 40 is mounted on the wheel 36 and carries a wire line 42 wrapped around it (FIG. 5).

Figure 6:
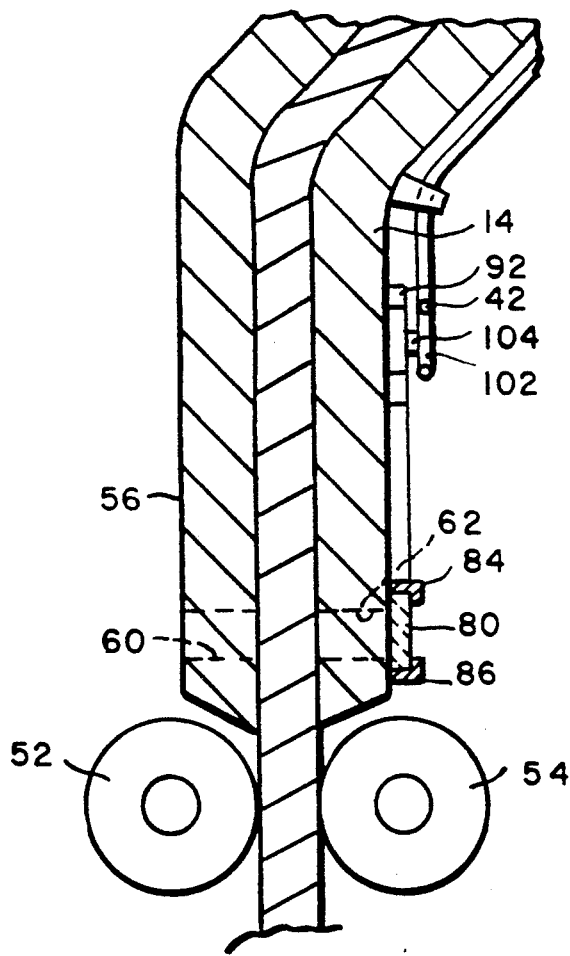
FIG. 6 is an enlarged side sectional view of the lower portion of the feed chute of FIG. 1 showing further details of the aperture coupling.

The lower end of the chute 14 extends through an aperture 50 in the housing 12 and terminates just above the nip of a pair of rollers 52, 54. The rollers are spaced apart by approximately the width of an X-ray film 15 that is fed between them from the chute 18. Roller 54 is driven by a motor 55; roller 52 rotates in response to advancement of the film 15 by roller 54. A front guide plate 56 extending parallel to the plane of the chute 14, and separated from it by slightly more than the thickness of the film, helps guide the film to the rollers. The chute and guide plate are curved into the vertical plane at their lower ends to thereby align the film with the vertical (FIG. 6) on discharge of the film to the rollers. After passage through the rollers, the film exits through aperture 58 in the bottom of the housing 12 and thence into tray 59.

Apertures 60, 62 (FIG. 6) are formed near the lower end of the chute 14 and guide plate 56 just above the rollers. These apertures are aligned in the horizontal plane with a horizontally extended light source 64 and an imaging lens 66 which images that portion of the film in the path of the apertures onto a converter 68 through baffles 70, 72, 74. Shutter plates 80, 82 slide in a channel defined by lips 84, 86 on the rear face of chute 14 and occlude the aperture 62 to a greater or lesser extent dependent on their horizontal position relative to the aperture. Vertical arms 88, 90 extend upwardly from the shutter elements 80, 82 to horizontal arms 92, 94. The latter have teeth 96, 98 on the respective opposed faces thereof which engage a correspondingly toothed wheel 100. A pulley 102 is carried on the wheel 100 by means of a shaft 104 and turns with the wheel. The line 42 is wrapped around the pulley and continues around guides 104, 106, 108, 110 (e.g., simple eylet hooks) to the pulley 40.

In order to scan an X-ray film, the operator inserts the film into the tray and then slides the guides 16, 18 to a position just adjacent the edge of the film. This movement of the guides is transmitted through the arms 32, 34 to the wheel 36 and thence to the pulley 40 which is thereby rotated. Suppose, for example, that the guides are moved closer together. The wheel 36 and pulley 40 are then rotated in the clockwise direction as seen in FIG. 5. This causes the line 42 to thereby also move in a clockwise direction, that is, upward through guides 104, 106 and downward through guides 108, 110 Accordingly, pulley 102, and thus toothed wheel 100, are rotated in a clockwise direction. This moves guides 92 and 94 inwardly (that is, guide 92 moves to the left and guide 94 to the right in FIG. 5) and the shutter stops 80, 82 move correspondingly to close down the field stop to a smaller aperture. Thus the aperture is quickly and precisely accommodated to the film size.

Forming the apertures 60, 62 adjacent the rollers 52, 54 and just above them enables the operator to feed the X-ray film right side up for scanning, while ensuring that any identification on the film (which is typically inscribed on the upper portion of the film) is scanned while the film is still held securely between the rollers. Thus, the identification will be scanned in with the other information on the film. This also enables use of a simple shutter mechanism as described above for adjusting the width of the scanning aperture (field stop) to the width of the film being scanned.

Figure 7:
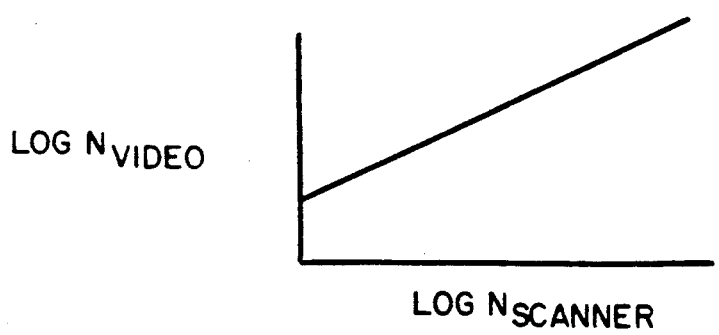
FIG. 7 is a diagram showing the scanner conversion used in accordance with the present invention.

The converter 68 is preferably a charge-coupled device. With present technology, a 6000×1 converter, that is, a converter having 6000 light-responsive elements in a linear array, is commonly available. These elements have a dynamic range of 6000:1, or roughly 13 bits, that is, they can resolve approximately $2^{13}$ discrete levels of light. However, typical computer systems based on the Intel 80286, 80386 and the like processor chips use only 8 bits for the video display. At least one prior scanner system has bridged this gap simply by dropping the lower order 8 bits of the converter output. However, this creates a noticeable discontinuity in the image at low light levels. In accordance with the present invention, we provide a smooth mapping of the scanner output to the video display input. The mapping is logarithmic, and is shown in FIG. 7 in which the vertical axis is the video display input, Nvideo, and the horizontal axis is the scanner output, Nscanner. The mapping in FIG. 7 is defined by the relation:

$$\text{Nvideo} = (\text{Nvideo:max} * \text{Nscanner}/\text{Nscanner:max})^\Gamma$$

where Nvideo is the magnitude of the driving signal to be applied to the video driver, Nvideo:max is the maximum value of the video driving signal (e.g., $2^8$), Nscanner is the magnitude of the scanner output, Nscanner:max is the maximum value of the scanner output (e.g., $2^{16}$), and $\Gamma$ is the "gamma" of the intensity curve. In the present invention, a gamma of 0.3 has been found to provide excellent results. This mapping significantly improves the low-level resolution of the scanner, while providing an essentially smooth transformation.

The scanner of the present invention is accomodated within a housing that is mountable in a standard Electronic Industries Association 19" cabinet rack. This makes it especially suitable for use in crowded laboratory environments such as are commonly found in hospitals where it can be efficiently integrated with other equipment with minimal additional space requirements. Further, the efficient optical and film feed design significantly reduce its cost so that it is more readily affordable by smaller institutions.

We claim:

1. An X-ray film scanning apparatus having an adjustable scanning aperture, the scanning apparatus including an illuminating lens and an imaging lens disposed in a straight-line optical path, the scanning apparatus also including feeding means for feeding an X-ray film between the illuminating lens and the imaging lens, comprising:

a film feed chute inclined to a vertical plane, with the chute having a lower end extending through an opening in the housing and terminating just above the film feeding means;

a pair of film edge guides mounted on either side of the chute, the film edge guides being slidably adjustable with respect to one another to accomodate films of different sizes, the film edge guides shaped to directly engage the film along the peripheral edges of the film;

a first pair of arm members mounted on said film edge guides, the first pair of arm members extending rearwardly away from the chute, and said arm members moving in a horizontal plane in relation to one another when said film edge guides are adjusted to accommodate the film;

a pair of shutter stops for defining the scanning aperture, the shutter stops occluding the scanner aperture to a greater or lesser extent dependent upon their relative horizontal position;

a second pair of arm members mounted on said shutter stops and extending away from said shutter stops; and arm coupling means, for translating movement of said first pair of arm members to said second pair of arm members, thereby causing relative movement of said shutter stops to adjust the scanner aperture according to the width of the film.

2. Apparatus as in claim 1 wherein said arm coupling means comprises:

first rotary movement translation means, centrally disposed between said first pair of arm members and connected to said first pair of arm members, for translating horizontal movement of said arm members to rotary movement;

second rotary movement translation means, centrally disposed between said second pair of arm members and connected to said second pair of arm members, for translating rotary movement to horizontal movement of said second pair of arm members; and a wire, coupled between said first and second rotary movement translation means so that resulting horizontal movement of the said film edge guides with respect to one another is transmitted through said first pair of arm members to said wire and then from said wire to said second pair of arm members.

3. Apparatus as in claim 1 wherein said first pair of arm members have opposing toothed faces and wherein said arm coupling means comprises:

a first toothed wheel, disposed to engage both of the opposing toothed faces of said first pair of arm members; and a first pulley, coupled to said first toothed wheel and carrying a wire line, the first pulley translating rotary movement of said first toothed wheel to the wire line.

4. Apparatus as in claim 3 wherein said first pulley and said first toothed wheel are mounted on a first common shaft.

5. Apparatus as in claim 1 wherein said second pair of arm members have opposing toothed faces and wherein said arm coupling means comprises:

a second toothed wheel, disposed to engage both of the opposing toothed faces of said second pair of arm members; and a second pulley, coupled to said second toothed wheel and carrying a wire line, the second pulley translating movement of said wire line to said second toothed wheel.

6. Apparatus as in claim 5 wherein said second pulley and said second toothed wheel are mounted on a second common shaft.

7. An X-ray film scanner comprising:

a housing including a scanning apparatus having an illuminating lens and an imaging lens, the illuminating lens and imaging lens disposed in a straight-line optical path with respect to one another, and the housing also including feeding means for feeding a film past the scanning apparatus, the scanning apparatus having an adjustable scanning aperture;

a film feed chute inclined to a vertical plane, with the chute having a lower end extending through an opening in the housing and terminating just above the film feeding means;

a pair of film edge guides mounted on either side of the chute, the film edge guides slidably adjustable with respect to one another to accomodating films of different sizes, the film edges guides directly contacting the film along the peripheral edges of the film;

a first pair of arm members mounted on said film edge guides, the first pair of arm members extending rearwardly away from the chute, and said arm members moving in a horizontal plane in relation to one another when said film edge guides are adjusted to accommodate the film;

a front guide plate extending parallel to the plane of the chute for guiding the film to said feeding means, the guide plate being curved in the vertical plane at its lower end to align the film with the vertical plane upon on the discharge of the film to the feeding means;

a pair of shutter stops for defining the scanning aperture, the shutter stops occluding the scanner aperture to a greater or lesser extend dependent upon their relative horizontal position;

a second pair of arm members mounted on said shutter stops and extending away from said shutter stops; and arm coupling means, for translating movement of said first pair of arm members to said second pair of arm members, thereby causing relative movement of said shutter stops to adjust the scanner aperture according to the width of the film.

8. An X-ray film scanner comprising:

a housing including feeding means for feeding a film past a scanning apparatus, the scanning apparatus having an adjustable scanning aperture;

a film feed chute inclined to a vertical plane, with the chute having a lower end extending through an opening in the housing and terminating just above the film feeding means;

a pair of film edge guides slidably mounted on either side of the chute, the film edge guides accomodating said film directly along the peripheral edges of the film;

a first pair of arm members mounted on said film edge guides, the first pair of arm members extending rearwardly away from the chute, the first pair of arm members having opposing toothed faces;

a first toothed wheel, centrally located between the opposing toothed faces of said first pair of arm members;

a first pulley, coupled to said first toothed wheel and carrying a wire line, the first pulley translating rotary movement of said first toothed wheel to the wire line;

a front guide plate extending parallel to the plane of the chute for guiding the film to said feeding means, the guide plate being curved in the vertical plane at its lower end to align the film with the vertical plane upon on the discharge of the film to the feeding means;

a pair of shutter stops for defining the scanning aperture, the shutter stops occluding the scanner aperture to a greater or lesser extent dependent upon their relative horizontal position;

a second pair of arm members mounted on said shutter stops and extending away from said shutter stops, the second pair of arm member having opposing toothed faces;

a second toothed wheel, centrally located between the opposing toothed faces of said second pair of arm members; and a second pulley, coupled to said second toothed wheel and also, carrying the wire line, the second pulley translating movement of said wire line to said second toothed wheel and as a result causing relative movement of said shutter stops to adjust the scanner aperture according to the width of the film.

* * * * *